UNITED STATES PATENT OFFICE.

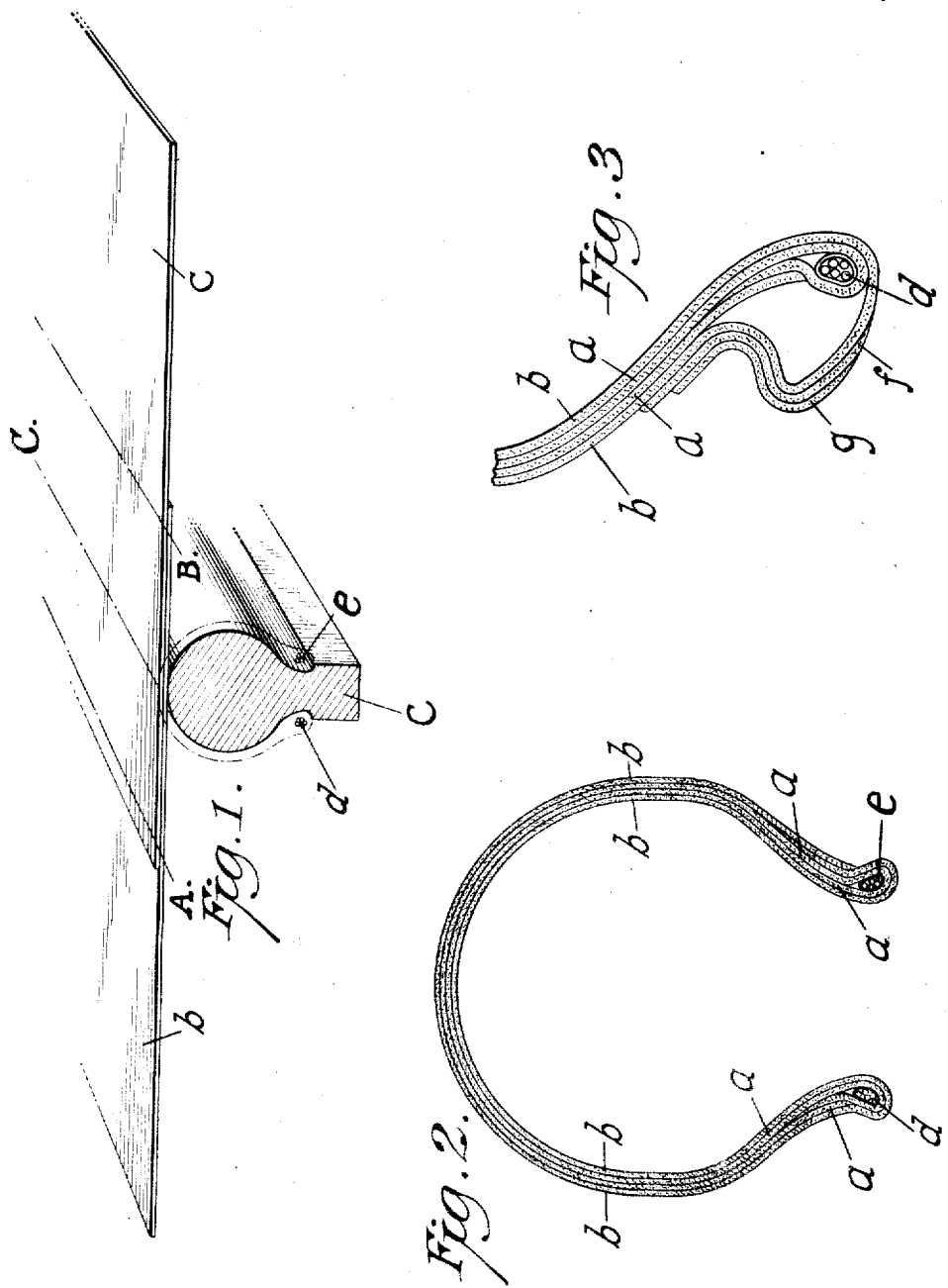

GEORGE F. FISHER, OF PLAINFIELD, NEW JERSEY, ASSIGNOR TO REVERE RUBBER COMPANY, A CORPORATION OF RHODE ISLAND.

TIRE.

1,349,124.  Specification of Letters Patent.  Patented Aug. 10, 1920.

Application filed July 15, 1915. Serial No. 39,979.

*To all whom it may concern:*

Be it known that I, GEORGE F. FISHER, a citizen of the United States, residing at Plainfield, county of Union, State of New Jersey, have invented certain new and useful Improvements in Tires, of which the following is a full, clear, and exact description.

This invention relates to pneumatic vehicle tires having a carcass preferably of woven thread fabric, and has for an object to provide therein greater resistance to distortion under load without loss of resiliency or increase of weight. Another object is to provide a stronger anchorage to the inextensible restraining elements located at the bead portions of a tire structure.

I accomplish these objects by a novel structure and method of accomplishing same, more fully set forth in the following specification, and illustrated in the accompanying drawings, wherein—

Figure 1 is a cross-sectional view of a tire core showing the method of applying the fabric;

Fig. 2 is a cross-sectional view of a tire carcass built in accordance with this invention; and Fig. 3 is a cross-sectional view of the bead portion of a carcass, showing this invention applied to a tire of the quick-detachable type.

To construct a tire according to this invention I apply symmetrically about the outer periphery C of a core $c$ two overlapping strips of ordinary frictioned tire fabric $a$ and $b$, the width of the overlapping portions being slightly greater than the distance about the core from the position of a bead wire $d$ to that of the corresponding wire $e$ on the opposite side, the total width of each strip being approximately twice the above distance. I then fold the fabric plies down over the core so that they hug the surface closely and put in position over them the bead wires $d$ and $e$, the relative position of the wires and the fabric being shown in Fig. 1 by the lines A and B. At this stage the core is covered by two plies of fabric with a single ply dependent from each side. I then fold up about the wire $d$ the short projecting part of the ply $a$, and about the wire $e$ the projecting portions of both the plies $a$ and $b$. The ply $a$ is carried back over the core until it overlaps its opposite margin just above the wire $d$. The long end of the ply $b$ is then similarly folded back over the whole until it overlaps its opposite margin at the wire $e$.

The above described method of applying the fabric to the core supplies an extremely firm bond for the wires, there being a continuous ply of fabric about each. The entire structure is also strengthened in that the warp and weft strands being disposed "on the bias," assume in the refolded portion of each ply an opposite relation to that in the two layers nearest the core.

The same method can be applied to a tire of the quick-detachable type, by forming the plies somewhat wider to overlap the hard rubber beads used therein. The latter are placed in position after the ply $a$ has been folded back over the core, the ply $b$ being then folded back into its final position to inclose them and bind them in place.

Circumferential strips $f$ and $g$ (Fig. 3) may be superposed on the ply $b$ to form an additional bed for the hard rubber bead and to protect it from any chafing action of the rim flange.

The remaining elements of the tire are applied to the carcass according to the usual method, and the whole completed by vulcanization as in the case of the conventional tire.

Having described my invention, what I claim and desire to protect by Letters Patent is:

1. The construction in tires which consists in providing two overlapping sheets of fabric; which overlapped portion conforms to the shape of the tire, the unlapped portions of said sheets being alternately doubled back over said tire to the opposite sides.

2. The construction in a tire carcass which consists in providing two sheets of fabric having their margins overlapping an amount slightly greater than the circumferential outer distance between the beads of the tire, said overlapping portions covering the tire symmetrically on each side thereof, the outer portion of the outer overlapping sheet extending around the bead wire and back over the tire to the opposite edge thereof, and the outer portion of the inner sheet extending around its corresponding wire and over the tire to the opposite bead.

3. A tire carcass comprising superposed plies of circumferentially continuous pieces of fabric looped around oppositely disposed beads and continuations formed of less than the whole number of said plies passing respectively from each bead to the opposite sides of the tire.

4. A tire carcass comprising two overlapped sheets of fabric the overlapped portion having a greater length than the circumferential outer distance between the beads of the carcass, the edges of the sheets adjacent the overlapped portion being wrapped around their respective bead wires and the portions of the sheets beyond the overlapped portion extending respectively back over the carcass bringing their respective edges to the opposite sides of the carcass adjacent the opposite bead and thereby binding the edge of the corresponding overlapped portion about the bead.

5. A tire for vehicle wheels comprising plies of fabric formed of a single width of fabric looped about oppositely disposed beads and joined together along its longitudinal margins immediately above one of the beads to form a lapped joint whereby each ply will be continuous throughout transversely from bead to bead.

6. A tire for vehicle wheels comprising plies of fabric formed of single widths of fabric looped about oppositely disposed beads and joined together along their respective longitudinal margins to form lapped joints disposed respectively on opposite sides of the tire.

7. A tire for vehicle wheels comprising plies of fabric formed of single widths of fabric looped about oppositely disposed beads and joined together along their respective longitudinal margins to form lapped joints disposed respectively on opposite sides of the tire immediately above the beads.

Signed at New York, N. Y., this 13th day of July, 1915.

GEORGE F. FISHER.